(12) United States Patent
Schlag

(10) Patent No.: US 7,009,136 B2
(45) Date of Patent: Mar. 7, 2006

(54) METHOD OF FABRICATING A BIPOLAR PLATE ASSEMBLY

(75) Inventor: Harald Schlag, Ruesselsheim (DE)

(73) Assignee: General Motors Corporation, Detroit, MI (US)

( * ) Notice: Subject to any disclaimer, the term of this patent is extended or adjusted under 35 U.S.C. 154(b) by 606 days.

(21) Appl. No.: 10/267,520

(22) Filed: Oct. 9, 2002

(65) Prior Publication Data

US 2004/0072053 A1    Apr. 15, 2004

(51) Int. Cl.
*H01M 8/02*    (2006.01)

(52) U.S. Cl. .............................................. 219/121.64

(58) Field of Classification Search ........... 219/121.64, 219/121.63, 121.72; 228/58; 429/210, 157
See application file for complete search history.

(56) References Cited

U.S. PATENT DOCUMENTS

| | | | |
|---|---|---|---|
| 5,096,518 A * | 3/1992 | Fujikawa et al. ........ 156/89.28 |
| 5,500,503 A * | 3/1996 | Pernicka et al. ....... 219/121.64 |
| 5,776,624 A | 7/1998 | Neutzler |
| 6,060,682 A * | 5/2000 | Westbroek et al. .... 219/121.64 |
| 6,337,120 B1 * | 1/2002 | Sasaki et al. .............. 428/66.4 |
| 6,375,365 B1 * | 4/2002 | Chau .......................... 385/88 |
| 6,576,863 B1 * | 6/2003 | Piltch et al. ........... 219/121.64 |

* cited by examiner

*Primary Examiner*—Jonathan Johnson
(74) *Attorney, Agent, or Firm*—Harness, Dickey & Pierce, P.L.C.

(57) ABSTRACT

A method of fabrication is adapted to weld paired metal plates, particularly fuel cell bipolar plates, using a partial vacuum to hold the paired metal plates together during the welding process. Each bipolar plate has a plurality of contact surfaces for joining the paired metal plates. The contact surfaces of a first plate are co-aligned with contact surfaces of a second plate. An outer perimeter and a plurality of reactant gas channels and ports of each plate pair are sealed to form a sealable interior volume. A partial vacuum is drawn in the interior volume to clamp each plate pair together at the contact surfaces and a weld joint is made between at least a plurality of the contact surfaces. Laser welding is preferably used for its ability to fuse the contact surfaces together without perforating the plates and thereby losing the partial vacuum.

19 Claims, 3 Drawing Sheets

METHOD OF FABRICATING A BIPOLAR PLATE ASSEMBLY

FIELD OF THE INVENTION

The present invention relates to a method and system to clamp and weld a bipolar plate assembly and the product thereof.

BACKGROUND OF THE INVENTION

Fuel cells have been proposed as a power source in a variety of vehicular applications, as well as other devices. One example of a fuel cell is the proton exchange membrane (PEM) fuel cell. PEM fuel cells include membrane-electrode-assemblies (MEAs) having a thin, proton-conductive, membrane-electrolyte with an anode electrode film formed on one face thereof and a cathode electrode film formed on the opposite face thereof. The MEA may also include a diffusion media for dispersing the reactant gases across the catalytic faces. The membrane-electrode assembly is sandwiched between a pair of electrically-conductive bipolar plate elements which serve as a current collector for the anode/cathode of the fuel cell and contain a plurality of lands and channels in the faces thereof for distributing the fuel cell's gaseous reactants (e.g., hydrogen and oxygen/air).

Each bipolar plate serves as an electrical conductor between adjacent fuel cells and is provided with a coolant flowing within a plurality of internal heat exchange passages to remove heat from the fuel cell. The common bipolar plate is an assembly constructed by joining two separate metal sheets or plates each having external facing reactant gas channels and internal facing coolant channels. In order to conduct electrical current between the anode portion of one cell and the cathode portion of the next adjacent cell in the fuel cell, the paired plates forming each bipolar plate assembly are mechanically and electrically joined.

Several methods to join bipolar plates are well known. In an exemplary application, the U.S. Pat. No. 5,776,624 issued to Neutzler provides a plurality of lands, which are mechanical connection points between plate pairs forming a bipolar plate. The plurality of lands in the Neutzler device are joined by a brazing process wherein the material used for brazing is carefully controlled to limit the insoluble metal which can leach from the brazed joints. The Neutzler brazing technique is effective at electrically joining adjacent plates of a bipolar plate assembly, but, difficult and costly to ensure a sufficient bond between the plates. Thus, an improvement providing a less expensive and less material critical joining method is desirable.

To limit the leaching problem identified above, brazed joints between the plates of a bipolar plate assembly are replaced by welded joints. In order to maintain the necessary metal-to-metal contact for welding, and, to ensure that the proper welding gap is provided, external pressure plates are commonly used to clamp the plates together and physically hold them during the period of time when welding takes place. Several drawbacks to the pressure plate welding method exist. First, a plurality of apertures or access holes must be included within the pressure plate(s) to provide access for the welding torch and welding beam (e.g., laser welding) to contact the desired surfaces of the plates. These apertures increase the cost and complexity for welding bipolar plates, particularly for complex bipolar plate channel and land geometries. A pressure plate prepared for a complex geometry of channels and lands generally can only be used for that design alone, which requires multiple pressure plate designs to accommodate various bipolar plate designs. This decreases the opportunity to use a particular set of pressure plates for welding more than one bipolar plate design because the arrangement of apertures in a pressure plate is highly dependent on the configuration of channels and lands on the individual plates forming each bipolar plate.

Another drawback of the pressure plate welding method results from the contact pressure adjacent to the individual welding sites which is lost by providing the welding apertures themselves. The pressure required to maintain clearance for welding is not significant; however, localized gaps between the paired plates forming the bipolar plates can occur where the apertures for welding do not provide sufficient force to maintain the paired plates in contact for welding.

A further drawback of the pressure plate welding method results because the plate thickness of the pressure plate increases the welding head separation from the welded surfaces. In a laser welding application, increasing this distance normally requires the addition of a special lens having a longer focal length and a smaller working angle which increases the cost of such a system. Also, a reduced percentage of acceptable weld joints can result.

It is therefore desirable to provide a method and system for clamping and welding pairs of plates to form bipolar plates which eliminates the need for pressure plates and therefore the expense and limitations of the pressure plate design. It is also desirable to provide a method and system for clamping and welding bipolar plates which reduces yet accommodates the occurrence of localized gaps between plate pairs to improve bipolar plate joining.

SUMMARY OF THE INVENTION

According to one aspect of the present invention, a method for joining fuel cell plates is provided. A pair of plates, forming a bipolar plate, each having a plurality of contact surfaces, are aligned and sealed about a circumference of the pair of plates. A partial vacuum is induced between the pair of plates which draws the two plates together in metal-to-metal contact at the contact surfaces. The plates are then welded together at the contact surfaces. A laser welding process is preferred to weld the bipolar plate contact surfaces together because the laser process permits fusing the contact surfaces without perforating the plate(s) and thus losing the partial vacuum.

In another aspect of the present invention, a method to clamp and weld fuel cell plates provides pairs of plates having contact surfaces and outer perimeters which are sealed to form an interior volume therebetween. A vacuum pump is then operated to draw a partial vacuum in the interior volume. A welder is operated to join the contact surfaces together. The partial vacuum is then released.

In yet another aspect of the present invention, a bipolar plate connection system includes plates having a plurality of coolant apertures, coolant channels, and lands. A vacuum attachment point is made at one of the coolant apertures for each plate of a plate pair to provide for attachment of a vacuum pump. A partial vacuum drawn by the vacuum pump between the plates draws the plates together for welding at contact surfaces defined by the intersection of adjacent land pairs between the plates. A weld joint then joins the plates at the desired contact surfaces.

In still another preferred embodiment of the present invention, a vacuum assisted welding system includes the outer perimeters of each of a pair of plates being sealable using a temporary seal. A partial vacuum is drawn in the interior volume between the plates. A plurality of contact surfaces are welded together. The temporary seal is removed following the initial welding of the contact surfaces between each of the plates. The outer perimeter is then permanently sealed by welding.

There are several benefits of the present invention to providing a partial vacuum to temporarily hold plates forming a bipolar plate assembly for welding. Coolant channels are generally available across a major portion of the surface of each plate forming a plate pair. Each of the coolant channels are generally joined such that a partial vacuum drawn at one aperture or section of a coolant channel will create a partial vacuum across the entire internal surfaces of the plate pair. The partial vacuum draws the entire facing surfaces of each of the plates together such that a mechanical exterior pressing plate is not required. By using the partial vacuum, any geometry of coolant channels, reactant gas transfer channels, or welding lands/contact surfaces can be accommodated. A simple connection point between a vacuum pump and the pairs of plates is all that is required.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
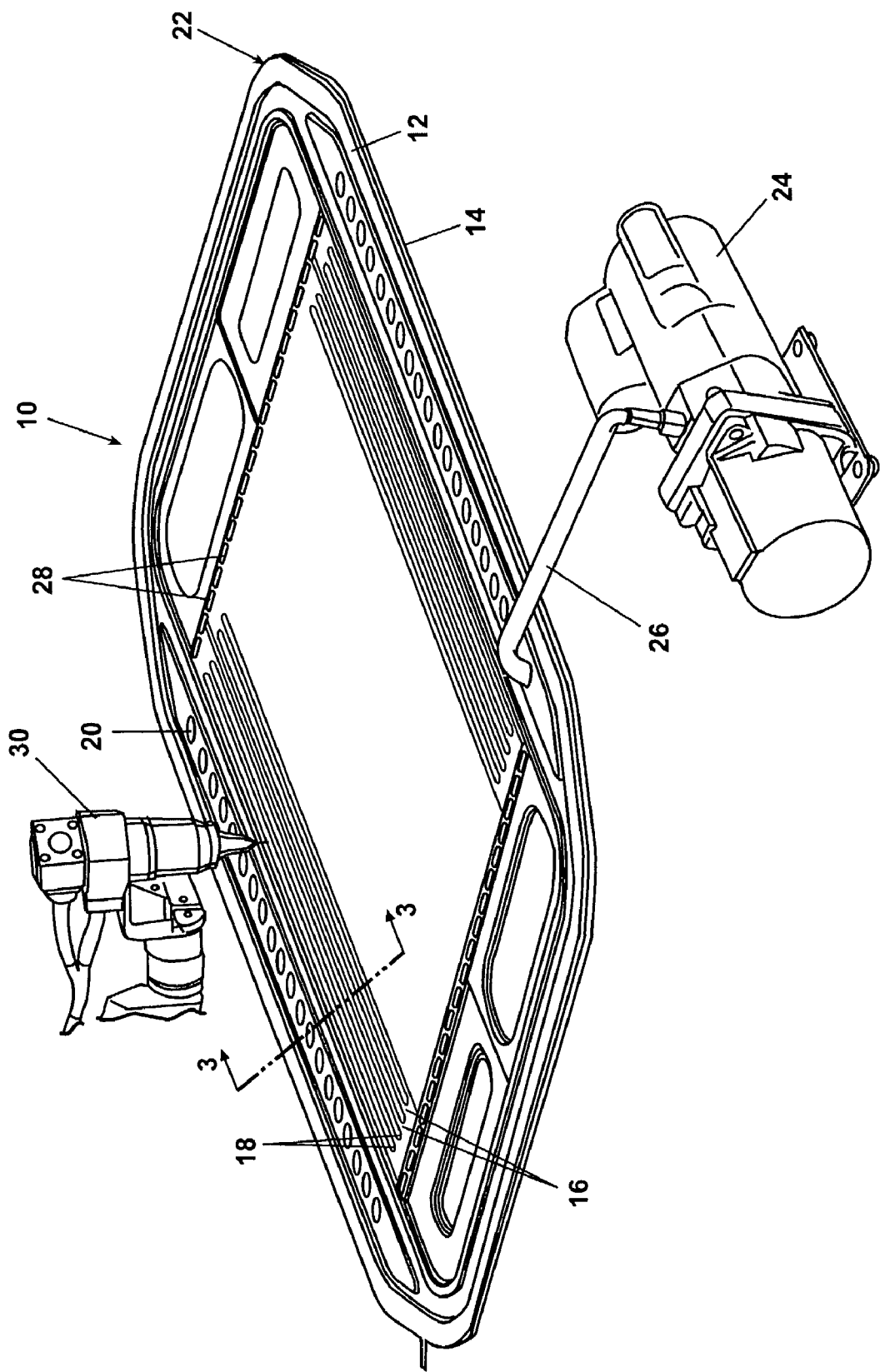
FIG. 1 is a perspective view showing a preferred embodiment of the vacuum-assisted bipolar plate welding system of the present invention.

Referring to FIG. 1, a preferred embodiment of a bipolar plate assembly 10 of the present invention is shown. The bipolar plate assembly 10 includes a first plate 12 and a second plate 14. Visible on the first plate 12 are a plurality of lands 16. The plurality of lands is separated by a plurality of channels 18. The second plate 14 also includes both a plurality of lands and channels (not shown). The channels 18 form a flow field to transport a reactant gas across the face of the first plate 12. A plurality of coolant flow ports 20 provide either an inlet or an outlet for coolant traversing individual plates of the bipolar plate assembly 10. The two plates 12, 14 of the bipolar plate assembly 10 each join at a flanged area 22 which is defined about a perimeter of the individual first plate 12 and the second plate 14, respectively. The geometry of the channels 18 are shown as serpentine flow channels arranged in a mirrored configuration. However, one skilled in the art will recognize that the present invention is not limited to a specific flow field design but has application to bipolar plates of similar design independent of the flow field geometry.

In the exemplary embodiment shown, to join the first plate 12 to the second plate 14, the flanged area 22 is preferably permanently sealed using a weld joint. The flanged area 22 can also be temporarily sealed as will be discussed below with reference to FIG. 2. The remaining coolant flow ports 20 are temporarily covered to seal the interior volume defined between the plates 12, 14. One of the coolant flow ports 20 is used as a vacuum attachment point. A vacuum pump 24 is connected by a vacuum hose 26 to one of the coolant flow ports 20 previously discussed. Ports 28 which provide entrance or exit flow for reactant gas(es) are also sealed for this welding procedure if the ports 28 form a boundary of the coolant area. In this exemplary embodiment, the plates 12, 14 are sealed/joined at the flanged area 22 and at the ports 28, both to enable formation of a partial vacuum between the plates 12, 14, and to prevent subsequent intermixing of hydrogen and air (i.e., normal reactant gases).

Figure 3:
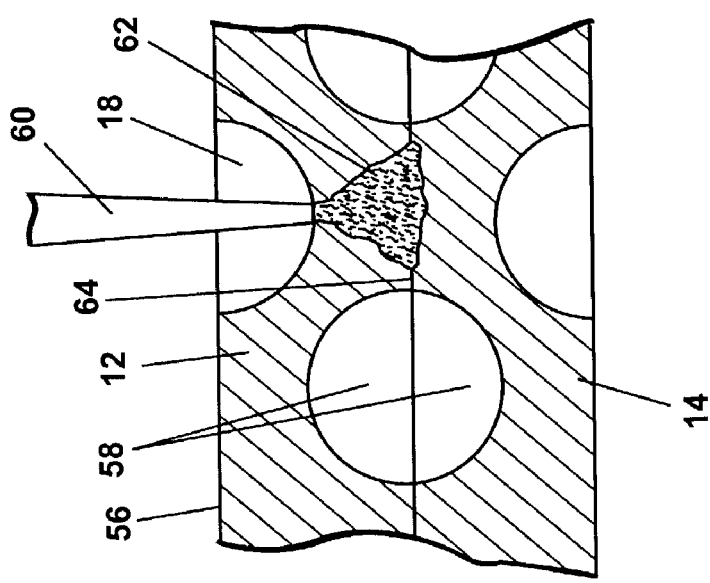
FIG. 3 is a partial section view taken at Section 3 of FIG. 1, showing a laser welding beam fusing adjacent contact surfaces between paired plates to form a bipolar plate assembly.

The vacuum pump 24 is operated to create a partial vacuum in an interior coolant area between the first plate 12 and the second plate 14 in order to draw the first plate 12 and the second plate 14 into metal-to-metal contact at a plurality of contact surfaces used for fusing the two plates 12, 14. As best seen in FIG. 3, the contact surfaces are defined on the interior faces of the plates 12, 14. After a partial vacuum is formed between the first plate 12 and the second plate 14, a welding apparatus 30 fuses the first plate 12 and the second plate 14 together at a plurality of the contact surfaces. If a temporary seal is used at the perimeter flanged area 22, the temporary seal is then removed and a permanent weld joint is made about the flanged area 22.

Figure 2:
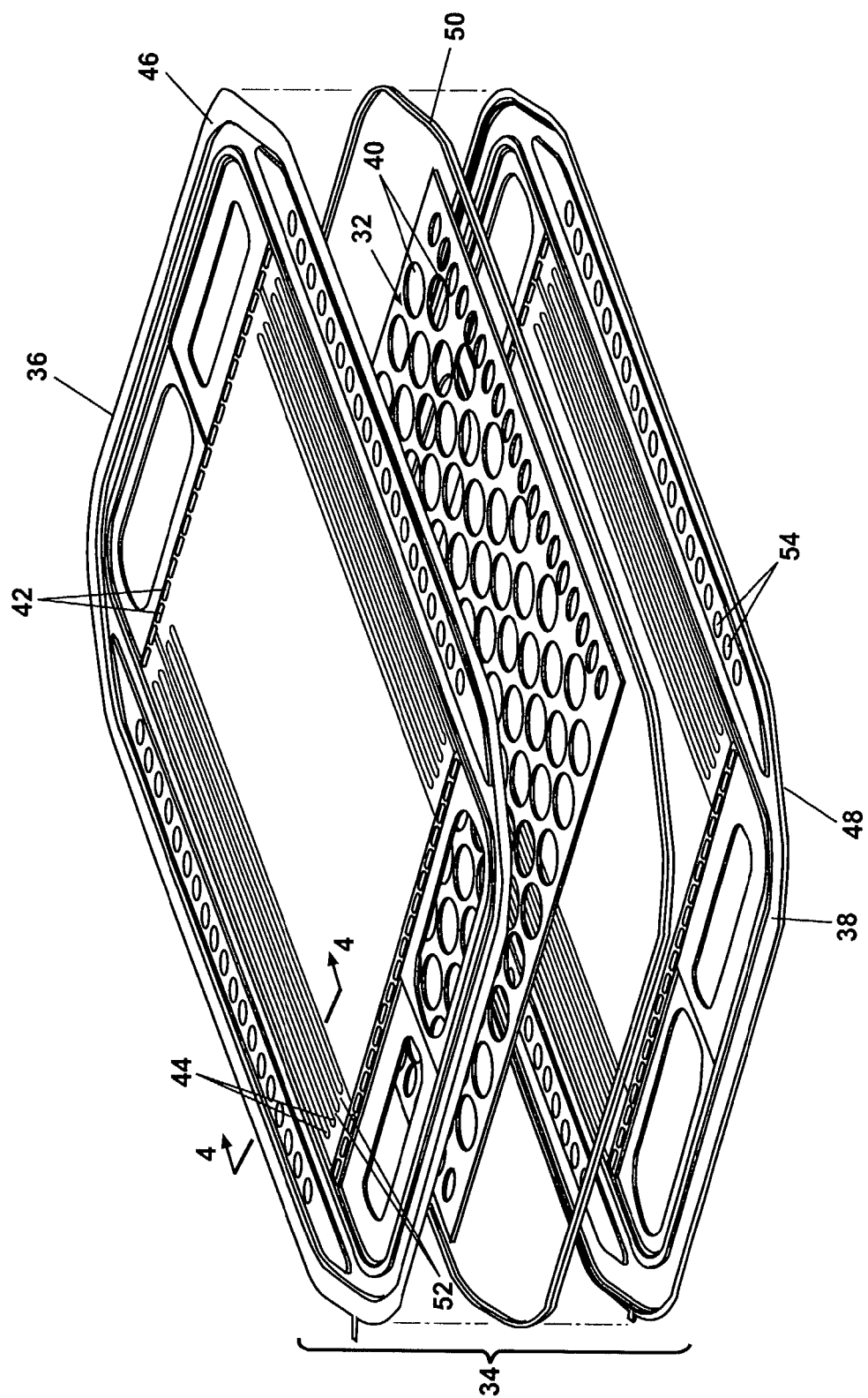
FIG. 2 is an exploded perspective view of the bipolar plate assembly of the present invention.

With reference to FIG. 2, a bipolar plate assembly 34 further includes an optional spacer plate 32 disposed between a first plate 36 and a second plate 38 with additional flow paths for coolant there-between. When the spacer plate 32 or similar element is positioned between plates 36, 38, each plate of the pair must be welded to the spacer plate 32 as best seen in reference to FIG. 4. A plurality of coolant apertures 40 are disposed in the spacer plate 32 to ensure that a fully turbulent flow of coolant exists between the two plates 36, 38. A plurality of reactant gas ports 42 are also identified, which provide inlets or outlets for reactant gas flow to each of a plurality of channels 44 formed in the face of the plates 36, 38.

In the embodiment shown in FIG. 2, to form the bipolar plate assembly 34, a first plate flange 46 is aligned with a second plate flange 48 and the two flanges are preferably welded. All interface areas between reactant gas channels or ports and the coolant volume are similarly welded. The welded joints can be formed by any welding method, provided the permanent seal surrounds the coolant volume as well as the plate perimeters. If a temporary joint is formed between the first plate flange 46 and the second plate flange 48, a seal 50 is disposed between the first plate flange 46 and the second plate flange 48 and the two plates 36, 38 are butted. All interface areas between reactant gas channels or ports and the coolant volume are similarly sealed. The seal 50 and the interface seals can be a gasket or a suitable removable sealant or sealant bead (not shown). Exemplary removable sealants include epoxies and similar adhesives. A partial vacuum is formed as discussed in reference to FIG. 1 and the contact surfaces of the bipolar plate assembly 34 are fused. Similar to the bipolar plate assembly 10, FIG. 2 shows a plurality of lands 52 between the channels 44, and a plurality of coolant flow ports 54.

Referring to FIG. 3, the partial cross section 3 of FIG. 1 is detailed. The first plate 12 includes the plurality of channels 18 on an outer face 56 and a plurality of coolant channels 58. The second plate 14 is similarly formed. Each groove 18 and each coolant channel 58 is generally disposed sequentially across the section of each plate 12 and 14. The partial vacuum formed in the coolant channels 58 draws the first plate 12 into physical contact with the second plate 14. A laser beam 60 is shown aligned with a base of one of the channels 18. The laser beam 60 forms a weld zone or fusion area 62 between abutting contact surfaces 64 of both plates 12, 14. The plurality of coolant channels 58 thus form a coolant flow field between the first plate 12 and the second plate 14.

Figure 4:
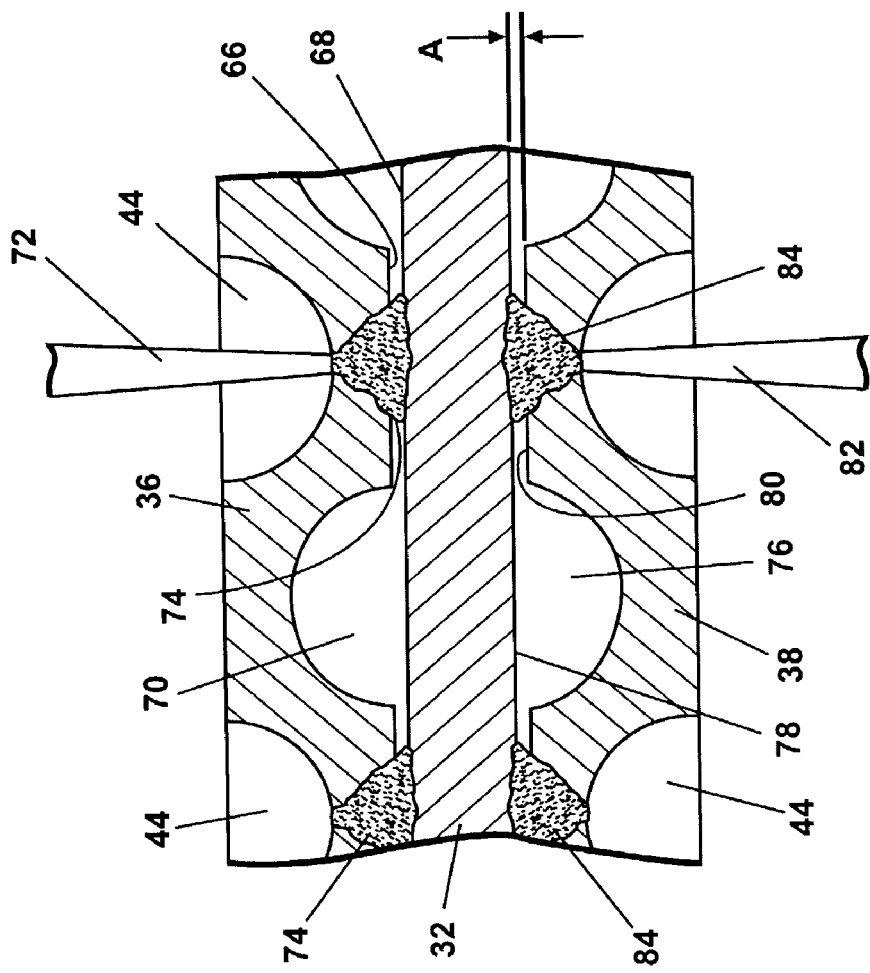
FIG. 4 is a partial section view taken at Section 4 of FIG. 2, identifying a separator plate positioned between plate pairs and an allowable welding gap between the contact surfaces of each plate and the separator plate.

Referring to FIG. 4, the partial cross section 4 of FIG. 2 is detailed. The spacer plate 32 separates the first plate 36 from the second plate 38. FIG. 4 further identifies an allowable clearance gap "A" between a contact surface 66 of the first plate 36 and a spacer plate first surface 68. The allowable clearance gap "A" is also shown between the second plate 38 and the spacer plate 32. The partial vacuum formed in each of a plurality of coolant channels 70 draws the first plate 36 into physical contact with the spacer plate 32 at the contact surfaces. A laser beam 72 functions similar to the laser beam 60 (shown in FIG. 3), forming a plurality of fusion areas 74. Similarly, the partial vacuum formed in a plurality of coolant channels 76 of the second plate 38 similarly draws the second plate 38 into physical contact along a spacer plate second surface 78 and a plurality of contact surfaces 80 of the second plate 38. A laser beam 82 creates each of a plurality of fusion areas 84. Both fusion areas 74, 84 differ from the fusion area 62 shown in FIG. 3 by the volume of fused material between the plates due primarily to the allowable clearance gap "A".

The allowable clearance gap "A" is shown in FIG. 4, but can also occur between the plates 12, 14 of FIG. 3. The allowable clearance gap "A" will vary depending upon a variety of conditions. These conditions include the thickness of the plates 12,14 and 36,38, the thickness and flatness of the spacer plate 32, the material of the plates 12, 14 and 36, 38 and the spacer plate 32, the type and energy of the welding equipment used, and the welding speed employed. An exemplary range of dimensions for the allowable clearance gap "A" ranges between 0 to approximately 20% of the material thickness, meaning 0 to approximately 0.02 mm for an exemplary 0.1 mm material thickness.

In accordance with the present invention, the complexity and geometry of various flow fields and thus contact surfaces can be accommodated with laser and other welding methods using a partial vacuum formed by the systems and methods of the present invention. The welding system employed can be readily programmed to form an intricate pattern of weld zones which may be repeatedly reproduced in an automated process.

In a preferred embodiment, the partial vacuum between plates 12, 14 and 36, 38 is formed over a range of pressures between approximately 200 grams/square centimeter ($g/cm^2$) up to approximately 800 $g/cm^2$. In another preferred embodiment, any partial vacuum (defined as an absolute pressure below atmospheric pressure) can be used depending on the geometry of the plates. In an exemplary case, as a result of partially evacuating the interior volume to approximately 200 $g/cm^2$, an external clamping force of approximately 800 $g/cm^2$ is generated—the difference between atmospheric pressure (approximately 1000 $g/cm^2$) acting on the exterior surface of the plates and 200 $g/cm^2$ acting on the interior surface. This will generate a force of approximately 800 grams per square centimeter or greater to hold the plates 12, 14 together. For an exemplary bipolar plate assembly 10 having a surface area of approximately 800 $cm^2$, the clamping force exerted on the plates 12, 14 at 200 $g/cm^2$ absolute is approximately 640 kg.

By monitoring the partial vacuum, the time required to form the initial contact between a pair of plates indicates the viability of the perimeter seal. The partial vacuum is sustained until an engagement condition is achieved between the two plates. The engagement condition is defined as contact or acceptable welding clearance between at least one contact surface of each of the two plates in an adjoining arrangement for welding. The engagement condition is sustained by the partial vacuum for a time period sufficient to form at least one weld joint. It is expected that an absolute pressure of approximately 500 $gm/cm^2$ is sufficient to produce the force necessary to seal common plate pairs. Thereafter, vacuum changes can be monitored as an indication of perforations in the plate(s).

The partial vacuum formed between the plates is normally capable of pulling the plates into intimate contact, including areas having slight defects in the plates (e.g., flatness or incompletely/improperly formed lands or channels). In another preferred embodiment, the partial vacuum can be changed to suit plate geometry. A loss of the partial vacuum during the welding process indicates a hole is formed in the plate to which the laser beam is applied. This indication provides the benefit of a quality check, as a hole destroys the function of the bipolar plate in the fuel cell. 100% welded contact surfaces are desirable where possible, however, particularly complex plate/groove geometry makes 100% welded contact surfaces impractical from a production standpoint. Therefore, 100% of the contact surfaces between joined plates do not have to be fused to form bipolar plates using the systems and methods of the present invention.

In still another preferred embodiment of the present invention, in place of the partial vacuum drawn within the coolant volume between the two plates forming a bipolar plate assembly, an external pressure can be used to bring the two plates into intimate contact for welding/sealing. In an exemplary application, the external pressure can be generated by placing the sealed bipolar plate assembly in a pressure chamber to provide an elevated external pressure. A pressure bleed line (in place of the vacuum hose 26 of FIG. 1) is connected to bleed the interior volume of gas (e.g., air or pressure chamber welding gas) to outside the pressure chamber, such that the external pressure forces the two plates into intimate contact for welding the contact surfaces.

The pressure-assisted bipolar plate welding assembly systems and methods of the present invention offer several advantages. A complex variety of contact surfaces between adjacent plates can be welded. A partial vacuum created between the plates sufficiently clamps the plates in a metal-to-metal contact position (or within an acceptable clearance dimension) for welding. In one preferred embodiment, a laser welding head has full access to each of the contact surfaces for welding because a pressure plate previously known in the art is not required when the partial vacuum is used to draw the individual plates into contact. By using an existing coolant port, the partial vacuum connection point for a selected plate of the bipolar plate assembly can be easily positioned. The coolant port therefore provides ready access to the interior volume such that the partial vacuum ensures sufficient clamping over a majority of the contact surfaces for welding between the plates.

The description of the invention is merely exemplary in nature and, thus, variations that do not depart from the gist of the invention are intended to be within the scope of the invention. For example, laser welding is identified as one preferred welding method. Other welding methods such as spot welding can be used. For a welding method which requires an inert gas atmosphere, the system and method of the present invention can be used, provided the vacuum source (e.g., vacuum pump) is connected remotely from the inert gas working envelope. The flanged perimeter of the pair of plates and the ports of each of the pair of plates can also be crimped prior to applying the partial vacuum. Coolant flow ports are identified as the connection point for vacuum pump connection. Other geometries of bipolar plates having alternate ports for connection of a vacuum pump are also possible.

What is claimed is:

1. A method for forming a bipolar plate assembly, comprising the steps of:
   providing a pair of metal plates adjacent one another to define an interior volume and a plurality of contact surfaces therebetween, each plate having a plurality of channels formed therein;
   inducing a partial vacuum in said interior volume for drawing said pair of metal plates together; and
   fusing said pair of metal plates together at least at one location of said plurality of contact surfaces.

2. The method of claim 1, wherein the step of fusing comprises welding said pair of metal plates using a welding process.

3. The method of claim 2, comprising welding said pair of metal plates using a laser welding process.

4. The method of claim 1, comprising forming a seal between said pair of metal plates about a flanged perimeter thereof and at ports of said plates thereof prior to said vacuum inducement step.

5. The method of claim 4, wherein the step of forming said seal between said pair of metal plates comprises installing at least one temporary seal material at said flanged perimeter between said plates and at said ports of said plates.

6. The method of claim 5, further comprising the steps of:
   removing said temporary seal material after said metal plates are fused together; and
   fusing said flanged perimeter of said metal plates.

7. The method of claim 4, wherein the step of forming said seal between said pair of metal plates comprises welding said perimeter of each of said metal plates about said flanged perimeter thereof.

8. The method of claim 4, wherein the step of forming said seal between said pair of metal plates comprises providing a sealant bead at said flanged perimeter between said plates and at said ports of said plates.

9. The method of claim 8, further comprising the steps of:
   removing said sealant bead after said metal plates are fused together; and
   fusing said flanged perimeter of said metal plates.

10. The method of claim 1, wherein the step of fusing said pair of metal plates comprises crimping together sealing flanges formed around a perimeter of each of said pair of metal plates and the ports of each of said pair of metal plates.

11. The method of claim 1, further comprising the step of positioning at least one spacer plate between said pair of metal plates in said interior volume such that said plurality of contact surfaces are formed between each of said pair of metal plates and said at least one spacer plate.

12. A method to weld fuel cell plates, comprising the steps of:
   arranging two plates in an adjacent relationship to form a bipolar plate having an interior volume, each plate having an outer perimeter and a plurality of contact surfaces within said interior volume;
   sealing said bipolar plate at a joint formed between said two plates at said outer perimeter of each plate;
   forming a partial vacuum in said interior volume with a vacuum pump; and
   fusing at least one of said contact surfaces of each of said two plates together.

13. The method of claim 12, further comprising the step of sustaining said partial vacuum until an engagement condition is achieved between said plurality of contact surfaces.

14. The method of claim 12, wherein the step of fusing comprises welding a joint between at least one adjacent pair of said plurality of contact surfaces.

15. The method of claim 14 wherein the step of welding comprises welding said two plates together with a laser welding process.

16. The method of claim 12, wherein the step of sealing comprises forming a temporary seal between said outer perimeters of said two plates.

17. The method of claim 16, further comprising:
   removing said partial vacuum after fusing said at least one of said contact surfaces of each of said two plates; and
   welding said outer perimeters of said two plates.

18. The method of claim 12, wherein the step of forming said partial vacuum comprises lowering an absolute pressure in said interior volume to one of less than and equal to approximately 800 grams/square centimeter.

19. The method of claim 12, further comprising the step of positioning at least one spacer plate between said two plates in said interior volume such that said plurality of contact surfaces are formed between each of said two plates and said at least one spacer plate.

* * * * *